United States Patent [19]
Dombrowski

[11] Patent Number: 5,584,731
[45] Date of Patent: Dec. 17, 1996

[54] TRIM POSITION INDICATOR AND METHODS OF USING SAME

[76] Inventor: Thomas A. Dombrowski, 10414 West Herda Pl., Franklin, Wis. 53132-1504

[21] Appl. No.: 550,993

[22] Filed: Oct. 31, 1995

[51] Int. Cl.⁶ .................................................. B63H 5/12
[52] U.S. Cl. ................................ 440/2; 114/270; 33/365
[58] Field of Search .................... 440/2, 53; 33/328, 33/347, 365, 389; 114/270

[56] References Cited

U.S. PATENT DOCUMENTS

| | | |
|---|---|---|
| 1,059,396 | 4/1913 | Russell . |
| 1,101,309 | 6/1914 | Neff . |
| 1,255,744 | 2/1918 | Hench . |
| 1,380,999 | 6/1921 | Moor ............................................ 33/365 |
| 1,630,172 | 5/1927 | Custer . |
| 1,898,162 | 2/1933 | Bair . |
| 3,245,150 | 4/1966 | Roe . |
| 3,422,544 | 3/1969 | Wyse . |
| 4,459,115 | 11/1984 | Ballard ...................................... 440/2.53 |
| 4,652,878 | 2/1987 | Borgersen ................................ 340/984 |
| 4,722,705 | 4/1988 | Rawlings ..................................... 440/2 |
| 4,908,766 | 3/1990 | Takeuchi ................................... 364/448 |
| 4,931,025 | 6/1990 | Torigai et al. ............................. 440/1 |
| 4,989,327 | 2/1991 | Morton ...................................... 33/365 |
| 5,058,283 | 2/1991 | Wise et al. ................................ 33/371 |
| 5,063,679 | 4/1991 | Schwandt .................................. 33/347 |
| 5,094,637 | 11/1992 | Nakamura ................................... 440/1 |
| 5,118,315 | 11/1992 | Funami et al. .............................. 440/1 |

OTHER PUBLICATIONS

Pp. 202-7, Encyclopedia of Outboard Motorboating by Hank Wieand Bowman, ©1955 by A. S. Barnes and Company, Inc., New York, NY.

*Primary Examiner*—Jesus D. Sotelo
*Attorney, Agent, or Firm*—Michael D. Fitzpatrick

[57] ABSTRACT

A trim position indicator for outboard motors or the like for determining the tilt or angularity of the propeller with respect to a parallel position to the water level. The indicator is attached to the motor shroud to give an indication of the angle between the axis of the motor propeller and the water surface. When the motor is tilted, e.g. as the boat comes up to planing speed, the trim position indicator indicates the angular degree of tilt by means of a float therein which no longer is centered between two indicator markings. Consequently, appropriate trimming measures may be taken so that maximum propulsion is restored. The sensing member may be in the form of an air or light gas filled spherical float which, due to the higher specific gravity of the liquid surrounding it, seeks the highest point within the arc shaped level. Methods of mounting the trim position indicator on outboard boat motors both with and without hydrofoil stabilizers are also provided.

20 Claims, 9 Drawing Sheets

TRIM POSITION INDICATOR AND METHODS OF USING SAME

1.0 RELATED APPLICATIONS

None

2.0 BACKGROUND

On occasion, nearly all outboard motor owners have noted that their motors will suddenly rev up excessively without a corresponding increase in boat speed—and frequently with a noticeable drop off in boat momentum. This phenomenon is called cavitation. Cavitation is that condition that occurs when the propeller is brought into contact with excessively disturbed or turbulent water. Air is drawn from the water's surface through the propeller, which thus relieved of the burden of drawing heavier water into its slip stream, responds by revolving faster. Acting more proportionately on air than on water, the propeller's effectiveness is reduced; the blades merely churn instead of thrusting.

To prevent cavitation and improve performance, an outboard motor should be operated in such a position that the propeller's thrust is vertical to the water line and so that when the boat is planing or nearly planing the motor's anti-cavitation plate is parallel to the water's surface. All outboard motors are equipped with a means of angle adjustment. This may be accomplished by shifting a bolt location in a slotted member or by wing-nut adjusting bolts or by similar means dependent on the particular make of motor.

Boat manufacturers, too, have nearly universally established a 12 degree angle from perpendicular to the transom. This angle is provided for with a dual purpose: to permit free adjustment of the motor and also to prevent water turbulence and resulting propeller slipping.

On lightweight boats with relatively modest horsepower motors, it may be found that the angle of attack of the propeller determined by the motor angle of adjustment must be altered when boat load is increased or decreased. A motor which is mounted in such manner that its propeller is tilted downward and away from a vertical axis with the water line will cause a lightweight boat to squat and perhaps even fail to get up on plane. With a sufficiently large motor, which despite an incorrect angle of adjustment still succeeds in getting a boat up on plane, the steering characteristics will be difficult. The boat will tend to rear its bow high in the air and drop back onto the water again in a constant and annoying porpoising action. If, by contrast, the motor is kicked in too close to the transom, it will get up on plane readily but will then ride nose-heavy and plow the water. This will not only reduce speed but will tend to make the boat broach in turning and take on a snaking steering characteristic in straight-ahead operation.

The final proper engine angle at which a boat will handle at its best and offer maximum performance is the angle at which the propeller is driving parallel to both the boat's keel line and the water's surface.

The above background discussion is taken from pages 203–206 of *The Encyclopedia of Outboard Motorboating* by Hank Wieand Bowman (Library of Congress Catalog Card Number: 55–6649. Copyright 1955 by A. S. Barnes and Company, Inc., New York, N.Y.) which is incorporated by reference.

In the past, various devices have been employed with outboard and outboard-inboard motor boats providing so called power trim units for the boat to vary the planing attitude of the boat, and motor tilt devices to vary the tilt of the motor with respect to the boat transom. Such devices have included trim gauges of one type or another to indicate the degree of tilt of the outboard portion of the motor with respect to the transom. Such indicators may also indicate the distance that the motor is moved away from the transom which is simply another form of tilt indication with respect to the transom.

Such devices do not indicate the relative position of the outboard motor with respect to the water and give no accurate indication of whether the axis of the propeller shaft is parallel to the line of travel of the boat, or in other words whether the axis of the propeller shaft is parallel to the surface of the water. In such parallel condition, the motor should be perpendicular to the surface of the water or line of travel of the boat.

It has long been a problem to present the maximum propulsion force in such boats both for economy purposes and high speed performances. Such problems are well typified by an upward direction of thrust of the propeller causing the well-known rooster tail with a consequent loss of energy and fuel and a downward thrust causing a bow-heavy boat.

For the foregoing reasons, there is a need for an economical device which can assist one in positioning the outboard motor with respect to the transom for maximum performance.

3.0 SUMMARY

3.1 The Discovery

On Apr. 1, 1995, I purchased a new Alumnacraft fishing boat. Since this is the first boat I ever owned, I was very interested is setting the motor up properly to get the best performance out of the boat/motor combination.

After taking the boat out several times, I experimented with different pitch propellers. I was told to use a lower pitch propeller when I had several people along and to use a higher one when I was alone. For my 18 HP motor, there are three different pitches available.

Changing the propeller pitch made some difference in performance, but it wasn't worth the bother of changing the propeller.

While reading the repair manual for my motor, I came across a section on drive unit fundamentals. In this section it explained propeller pitch, propeller diameter, two blade propellers versus three blade propellers, etc.

One of the things it also stated was: An outboard motor should operate with the anti-cavitation plate running parallel to and barely below the surface of the water. A minor adjustment in the tilt angle can make a considerable difference in the speed and performance of the unit.

Following the diagram in the manual, I located the tilt adjusting pin on my motor, and discovered it had several positions. The next time I took the boat out, I looked down at the anti-cavitation plate while I was moving. I noticed it was just below the surface of the water. Since that was not the problem, I started trying different settings to the tilt angle. That was my problem, for when I moved the pin one position down, the motor ran smoother and the boat went much faster. I then tried another position down, this time the motor ran rough, and the speed dropped noticeably.

This experiment really excited my curiosity. I started looking in my boating magazines for some type of gauge that would tell me when the propeller was running parallel to the surface of the water. I discovered that several different vendors made devices called Trim Gauges.

Instead of sending away for one, I went down to my Marine dealer and asked if they carry any of these, showing the person the magazine page. He laughed and told me not to waste my money. He told me the only time he can see having one of these in a boat is if you have an inboard motor. With an inboard, you can't see the lower unit, and if you are in shallow water you need to know if the lower unit is tilted up or down so the propeller does not hit bottom. I then explained to him that I wanted to use this device so I could tell if the propeller was running parallel to the surface of the water. He told me none of these devices will tell you that; they will only show you the angle between the motor and the transom (back of the boat).

Since there was nothing I could find that would tell me what I needed to know, I started thinking of a solution to my problem. I started out with a simple line level that I used around the house. I placed the level on the anti-cavitation plate of my motor. I then raised the front of the trailer until the level was centered. I then placed the level in the center of the outboard motor's cover. I was going to use two sided foam pads to mount the level to the cover, but since one side of the cover was lower, I had to add three pads to one side, one under the other. The level was now indicating the true orientation of the anti-cavitation plate.

I then took the boat out with my wife and daughter on July 8th to see if my idea worked, and did it ever. The motor had never run so smooth, and the boat never went so fast. My setting from the last trip out was close, but just by asking my wife to sit one seat forward moved the level to center, and what a difference that made. There was only one problem with the level I used—it had an air bubble to indicate center. If I went through several large wakes, the air bubble would form several smaller bubbles making it hard to read until it settled down.

One of things that surprised me the most was that when you adjust the motor to run best at high speed I thought it would be set for both high and low speed. But that isn't the case at all. Low speed operation requires a completely different setting. Depending upon the type of boating you are going to be doing, the motor's tilt pin needs to be adjusted to get the best performance out of the motor. My motor never ran well at low speed until I set the propeller to run parallel with the surface of the water. I now have two positions marked: one for high speed and the other for low speed.

3.2 Opening

Thus by means of my invention, there has been provided a trim position indicator which when attached to the shroud or cover of an outboard motor will indicate to the operator the angular position of the anti-cavitation plate with respect to the surface of the water or the degree of angular tilt away from the horizontal position. By adjustment of the tilt angle of the motor or the trim of the boat, the anti-cavitation plate of the motor may be brought to the horizontal position where the axis of the propeller shaft is in the line with the direction of travel of the boat and parallel to the surface of the water for maximum thrust and efficiency.

Thus, the present invention is directed to a device that satisfies this need for a simple, economical, and convenient means to adjust the trim of a boat and the relative angle of the anti-cavitation plate of the motor with respect to the water surface.

3.3 Contents

Basically the present invention comprises both a trim position indicator and the method of installing and using the same.

The trim position indicator consists, first of all, of a closed upwardly arched arcuate transparent tube which is filled with a low-freezing-point liquid and has a spherical float of lesser specific gravity than the liquid floating therein. At one end of the tube is attached a means for pivoting to which is attached a mounting base with adhesive material on the bottom surface thereof. At the other end of the tube is a means for adjusting height which includes a means for pivoting. This means for pivoting is attached to this end of the tube at the bottom portion of which is an aperture for the reception of a threaded screw to which is also attached a mounting base with adhesive material on the bottom surface thereof. When this trim position indicator is attached to the upper surface of the motor cover and properly adjusted, it gives an accurate indication of the angle of the cavitation plate of the motor with respect to the water surface. With such an indication available, the boat operator can easily adjust the trim of the boat so that the cavitation plate is parallel to the water surface.

Since there is a means for pivoting at both ends of the level, both of the mounting bases of the trim position indicator can be rotated until they rest squarely against the upper surface of the motor cover even in those cases where the upper surface of the motor cover has a sharply curved or irregular shape. A level with a flat bottom surface would not sit squarely on a sharply arched motor cover, and might tend to come loose under conditions of excessive vibration. When the backing paper is peeled off the mounting bases and the mounting bases of the trim position indicator are pressed firmly on the motor cover in an orientation parallel to the axis of the propeller shaft, the trim position indicator sits rigidly in place and is no longer free to move with respect to its pivoting mechanisms. Since the mounting bases are securely fastened to the motor cover, no degree of freedom is available for any movement to occur with respect to the pivoting mechanisms. The mounting bases are circular in shape so that when the mounting base which is attached to the means for adjusting height is turned in order to vary the height and initially calibrate the trim position indicator, regardless of the amount the means for adjusting height is turned to obtain the desired level condition of the trim position indicator, the trim position indicator will appear aesthetically pleasing as it is mounted on the motor cover (being circular in shape), which would not be the case if the mounting base were square—then it would be positioned at an odd unaesthetically pleasing orientation with respect to the mounting platform attached to the means for pivoting at the other end of the tube. Also due to the unique manner in which the flexible ears or flaps of the support platforms are attached to pegs protruding from the pivot platform, the closed tube portion of the trim position indicator can easily be snap removed from the pivot platforms of the trim position indicator for cleaning or other purposes.

Very unique are the methods for initially calibrating the trim position indicator prior to peeling the backing paper from the sticky mounting bases in order to affix the trim position indicator in its final position on the motor cover. For example, for those motors not having a hydrofoil stabilizer attached to the anti-cavitation plate, the method briefly is:

(a) Place the trim position indicator on the upper surface of the anti-cavitation plate at an orientation parallel to the axis of the propeller shaft;

(b) Tilt the motor until the spherical float in the liquid filled level is centered within the level;

(c) Place the trim position indicator on the cover of the tilted motor at an orientation parallel to the axis of the propeller shaft;

(d) Adjust the height of the adjustable end of the trim position indicator until the spherical float is centered within the level; and (e) Peel the paper backing off each sticky mounting base and affix the height adjusted trim position indicator to the upper surface of the cover of the motor in an orientation parallel to the axis of the propeller shaft.

In the event the anti-cavitation plate of the motor has a hydrofoil stabilizer mounted on its upper surface, there will usually be enough clearance between the anti-cavitation plate and the hydrofoil stabilizer for two thin strips of metal or plastic to be inserted in the clearance (projecting outward therefrom like miniature diving boards) and sufficiently spaced apart to provide two support surfaces for the mounting bases of the trim position indicator. The trim position indicator is then placed on these two support surfaces in an orientation parallel to the axis of the propeller shaft prior to performing step (b) above. If there is insufficient clearance between the anti-cavitation plate and the hydrofoil stabilizer, for the insertion of these two strips of metal, strips of metal with strips of sticky tape at the end of their upper surface are pressed, sticky tape first, against the lower surface of the anti-cavitation plate to provide the two support platforms for the mounting bases of the trim position indicator to rest on.

The above features are objects of this invention. Yet further objects are as follows:

One of the primary objects of the present invention is to provide a trim position indicator which provides an indication of the relative angle between the propeller shaft and the surface of the water so that the trim of a boat may be adjusted for maximum performance and fuel economy.

Another object is to provide a trim position indicator having a spherical float therein which will not break up as an air bubble would under the conditions of vibration normally encountered on a fast moving motorboat.

An additional object is to provide a trim position indicator whose liquid will not freeze in colder weather.

Yet another object is to provide a trim position indicator which is easy to read and use even in poorly lit surroundings.

Another object is to provide a trim position indicator in which the spherical float therein quickly assumes a new position without excessive oscillation when the trim position indicator is tilted.

Still another object is to provide a trim position indicator in which the spherical float therein indicates the angle of tilt of the trim position indicator by the new position it assumes when the trim position indicator is tilted. (If a straight tube were utilized rather than an upwardly arched curved tube the spherical float would move to the end of the tube when the tube was tilted rather than to an intermediate position which accurately reflected the degree of tilt of the tube.)

Yet another object is to provide a trim position indicator in which the height of an end thereof can easily be adjusted in order to initially calibrate the instrument, yet after the calibrated trim position indicator has been mounted on the motor shroud, it will adhere firmly to the motor shroud and retain its initial adjustment even under the vigorous vibrations encountered on a speeding motor boat.

An additional object is to provide a trim position indicator, in which the tube containing the float can easily be disconnected from the rest of the trim position indicator for cleaning and other purposes.

Still another object is to provide a trim position indicator which can easily be initially calibrated even on boat motors which have a hydrofoil stabilizer attached to the anti-cavitation plate.

For those liquid filled levels having the following characteristics:

(a) at least one end of the level is of adjustable height;

(b) at least one indicator marking on the level indicates the center thereof; and (c) a substantially spherical float is floating in the level; yet another object is to provide methods of mounting the liquid filled level on the shroud of a motor with or without a hydrofoil stabilizer in order to provide an indication of tilt angle so that the tilt angle can be adjusted for optimal performance.

A further object is to provide a trim position indicator that is simple and easy to use.

A still further object is to provide a trim position indicator that is economical in cost to manufacture.

These and other objects, features, aspects, and advantages of the present invention will become better understood with regard to the following description, appended claims, and accompanying drawings and will be otherwise apparent to those skilled in the art.

For the purpose of illustration of this invention, a preferred embodiment and several nonpreferred embodiments are shown in the accompanying drawings. It is to be understood that this is for the purpose of example only and that the invention is not limited thereto.

4.0 BRIEF DESCRIPTION OF THE DRAWINGS

Figure 1:
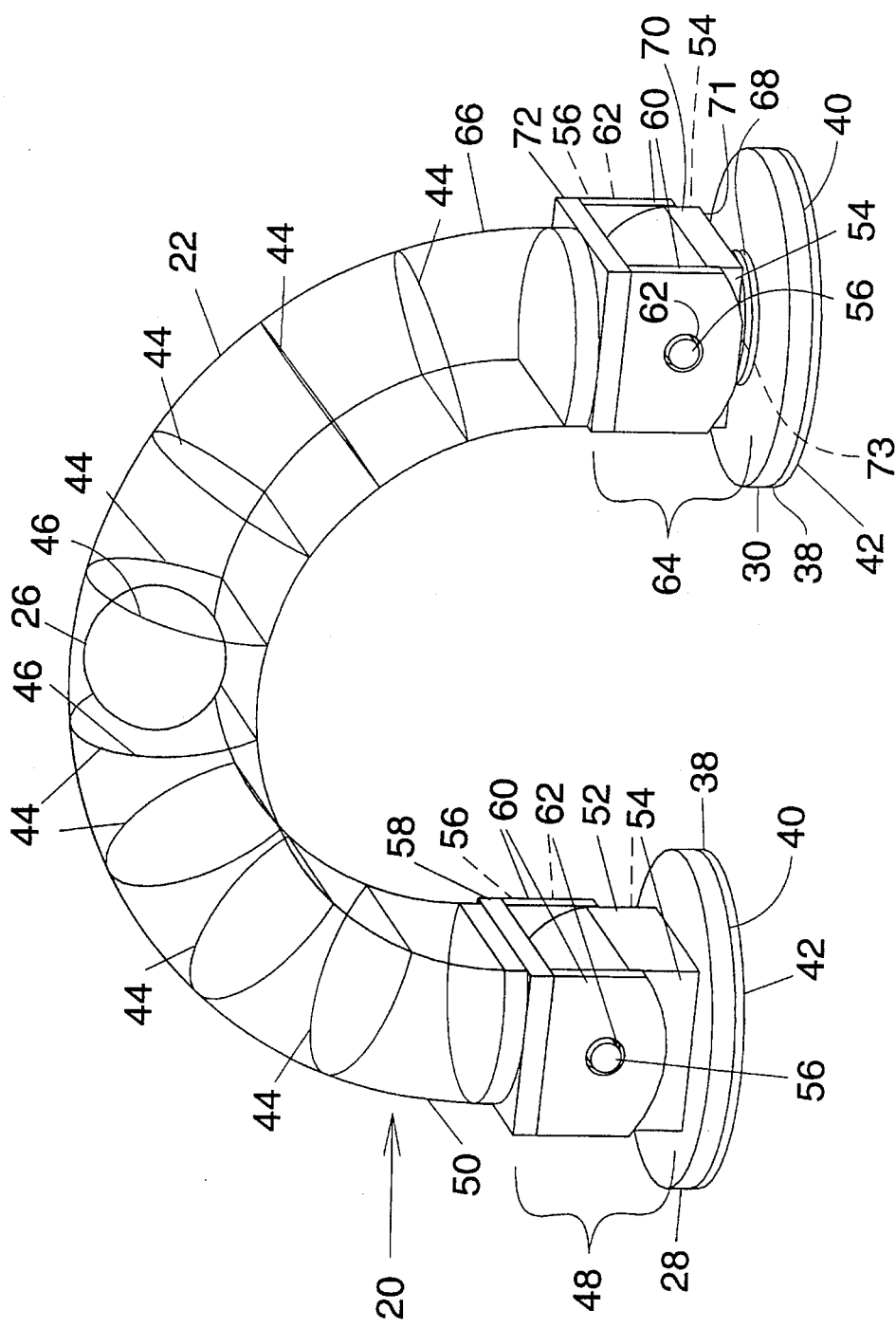
FIG. 1 shows a perspective view of the preferred embodiment.

5.0 DESCRIPTION 5.1 Definitions anti-cavitation plate—plate mounted on lower unit above propeller line to prevent boat and surface disturbances from causing turbulent water to reach propeller.

bow—The foremost or front part of a boat.

cavitate (cavitation)—propeller slippage in disturbed water causing the engine to rev excessively without corresponding forward motion. Cavitation is that condition which arises when the propeller is brought into contact with excessively disturbed or turbulent water. Air is drawn from the water's surface through the propeller, which, relieved of the burden of drawing the heavier water into its slip stream, responds by revolving faster. Acting more proportionately on air than on water, the propeller's effectiveness is reduced; the blades merely churn instead of thrusting.

hydrofoil stabilizer—a device with aerodynamic properties attached usually to the upper surface of the anti-cavitation plate to reduce cavitation and porpoising and bring the stern up and force the bow down.

light gas—a gas such as helium or hydrogen which is lighter than air.

lower unit—all parts of an outboard motor below the powerhead.

pitch—the distance the propeller would advance in one revolution if it operated in a semisolid substance with no slippage.

porpoise—The action of an improperly trimmed boat or an underpowered boat wherein the bow lifts high out of the water and slaps down again onto the water surface repeatedly.

power trim gauge—a device which displays the relative angle between the transom (back of the boat) and the motor so adjustments can be made for best ride, performance and handling.

rooster tail—The spray following an outboard boat.

sticky tape—a two-sided tape with adhesive on both sides.

tilt angle—synonymous with trim angle.

transom—extreme stern crosswise member of the hull upon which the outboard motor is mounted.

trim—a term used to describe the way a boat rides in the water.

trim angle—the degree of tilt of the outboard portion of the motor with respect to the transom.

trim position indicator—a device which indicates the angle of the propeller shaft with respect to the water surface.

trim—the difference between the draughts measured at the forward and after perpendiculars. May be expressed as an angle.

5.2 Overview

The preferred embodiment of the present invention consists of a closed upwardly arching (convex upper surface) transparent tube filled with a low-freezing-point liquid except for a spherical float which floats therein. The spherical float is manufactured to have a specific gravity of less than the liquid in which it floats. At one end of the closed transparent tube is a means for pivoting and at the other end is a means for adjusting height by which the end of the closed transparent tube at that end may be raised or lowered. Just below and attached to both the means for pivoting and the means for adjusting height is a sticky mounting base whose lower surface is covered with a sticky adhesive, or a piece of tape which has adhesive on both sides. The sticky adhesive on the lower surfaces of the sticky mounting bases is covered with backing paper to keep the adhesive from sticking before the trim position indicator is placed in its final position on the motor cover. The trim position indicator is characterized by its indicating the relative angle between the propeller shaft and the surface of the water, as opposed to background art devices which only indicate the relative angle between the boat motor and the transom.

5.3 Detailed Description of the Elements

Turning now descriptively to the drawings, in which similar reference characters denote similar elements throughout the several views, FIG. 1 illustrates a trim position indicator, generally shown as 20.

The trim position indicator 20 consists, first of all, of a closed transparent upwardly arching or convexly shaped tube 22 which is filled with a low viscosity, low-freezing-point liquid 24 such as methyl alcohol or ethylene glycol (which can be diluted with water to reduce their viscosity, if necessary) and has a substantially spherical float 26 of lesser specific gravity than the liquid 24, floating freely in the liquid 24. By constructing the spherical float 26 to have a lesser specific gravity than the surrounding liquid, oscillation of the float 26 is minimized when the trim position indicator 20 is tilted. The same principle acts with respect to lighter than air balloons. They tend to remain stationary in the absence of wind since the air around the balloon damps the motion of the balloon. In the same way, the liquid around a lightweight float damps the motion of the float, and the lighter the float is, with respect to the surrounding liquid, the more quickly will oscillations cease and the float assume its final position.

It is preferred to use a low-freezing-point liquid with a freezing point of less than −20 degrees Fahrenheit and with a viscosity comparable to that of water. Preferably the float 26 is hollow and is filled either with air or with a gas which is lighter than air. This enables the float 26 to rise to the upper inner surface 36 when the trim position indicator 20 is in use. A float 26 must be used rather than an air bubble due to the excessive vibration which occurs when the boat is traveling at a high rate of speed; under these conditions, an air bubble tends to break up which makes it difficult to determine the position of the bubble. At either end of the tube 22 is attached a sticky mounting base 28, 30 by which the trim position indicator 20 can be affixed to the upper portion or surface of the cover 32 of the boat motor generally shown as 34 (in FIGS. 2–4). The sticky mounting bases 28, 30 are made of a firm material such as wood or plastic and are coated with tape with adhesive on both surfaces or an adhesive material 38 along their lower surfaces 40, 40. My most preferred sticky mounting base is 3M Company's Scotch™ Brand Heavy Duty Mounting Squares, which have a strong self-sticking virtually waterproof adhesive material on both sides of an approximately 1/16th inch thick durable pad. A piece of backing paper 42 covers the adhesive material 38, and is peeled off prior to affixing the trim position indicator 20 to the upper portion or surface 32 of the cover of the boat motor 34 in an orientation parallel to the axis 96 of the propeller shaft.

The upwardly arching tube 22 of the trim position indicator 20 has a plurality of indicator markings 44 on it. Two of these indicator markings, the central indicator markings 46, 46, are separated from one another by a distance approximately equal to the diameter of the float 26 and are positioned on the tube 22 so as to indicate that the trim position indicator 20 is level when the float 26 is centered between these two indicator markings 46, 46. Preferably both the float 26 and the indicator markings 44, 46 are luminescent, thus enabling the trim position indicator 20 to be used in dim light such as occurs at night.

In the preferred embodiment, the trim position indicator 20 further consists of a means for pivoting 48 at the first end 50 of the closed transparent tube 22 which connects the first end 50 of the tube 22 to the first sticky mounting base 28. In the most preferred embodiment, the first section of the means for pivoting 48 consists of a first pivot platform 52 fixedly attached to the first sticky mounting base 28. Each of the side surfaces 54, 54 of the first pivot platform 52 has a pivot peg 56 extending outwardly from it. The second section of the means for pivoting 48 consists of a first support platform 58 which is fixedly connected to the first end 50 of the tube 22. This first support platform 58 has two flexible ears or flaps 60, 60 projecting downwardly from it. Each of the flexible ears 60, 60 has a hole 62 extending through it. These holes 62, 62 are of a suitable size for the reception of the pivot pegs 56. The flexible ears 60, 60 of the first support platform 58 are removably fitted over the pivot pegs 56, 56 of the first pivot platform 52 in such a manner that the pivot pegs 56, 56 protrude through the holes 62, 62 in the flexible ears 60, 60. Thus the first pivot platform 52 is freely rotatable with respect to the first support platform 58.

Figure 8:
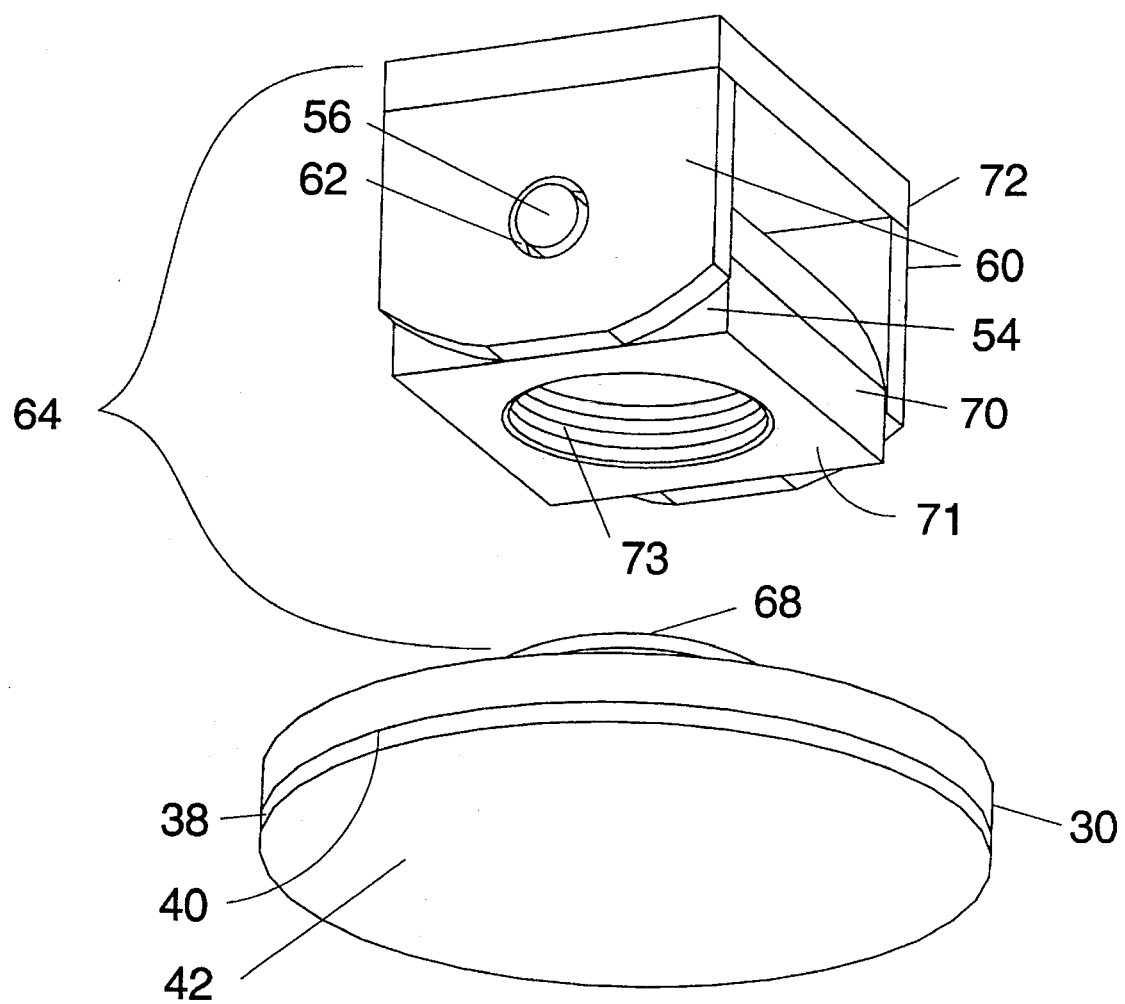
FIG. 8 shows an enlarged bottom perspective view of the second pivot platform of FIG. 1 with the threaded screw withdrawn in order to show the threaded aperture therein.

At the second end of the transparent tube 22 is a means for adjusting height 64 which connects the second end 66 of the tube 22 with the second sticky mounting base 30. The means for adjusting height 64 enables an adjustment to be made to raise or lower the second end 66 of the tube 22 so as to center the float 26 within the central indicator markings 46, 46. The means for adjusting height 64 consists of a threaded rod or screw 68 fixedly attached to the second sticky mounting base 30, a second pivot platform 70, the lower surface 71 of which has a threaded aperture 73 in it (best shown in FIG. 8) adapted to receive the threaded rod or screw 68. Each of the side surfaces 54, 54 of the second pivot platform 70 has a pivot peg 56 extending outwardly from it. Removably fitted over the pivot pegs 56, 56 are two flexible flaps or ears 60, 60 projecting downwardly from a second support platform 72. To accomplish this, each of the flexible ears 60, 60 has holes 62, 62 extending through them, these holes 62, 62 being sufficiently sized for the reception of the pivot pegs 56, 56. Thus, the flexible ears 60, 60 of the second support platform 72 are removably fitted over the pivot pegs 56, 56 of the second pivot platform 70 in such a manner that the pivot pegs 56, 56 protrude through the holes 62 in the flexible ears 60, 60. Thus, the second pivot platform 70 is rotatable with respect to the second support platform 72. Further, the flexible ears 60, 60 of each of the support platforms 58, 72 are made sufficiently flexible that they can be either snapably attached to or detached from the two pivot platforms 52, 70.

Figure 2:
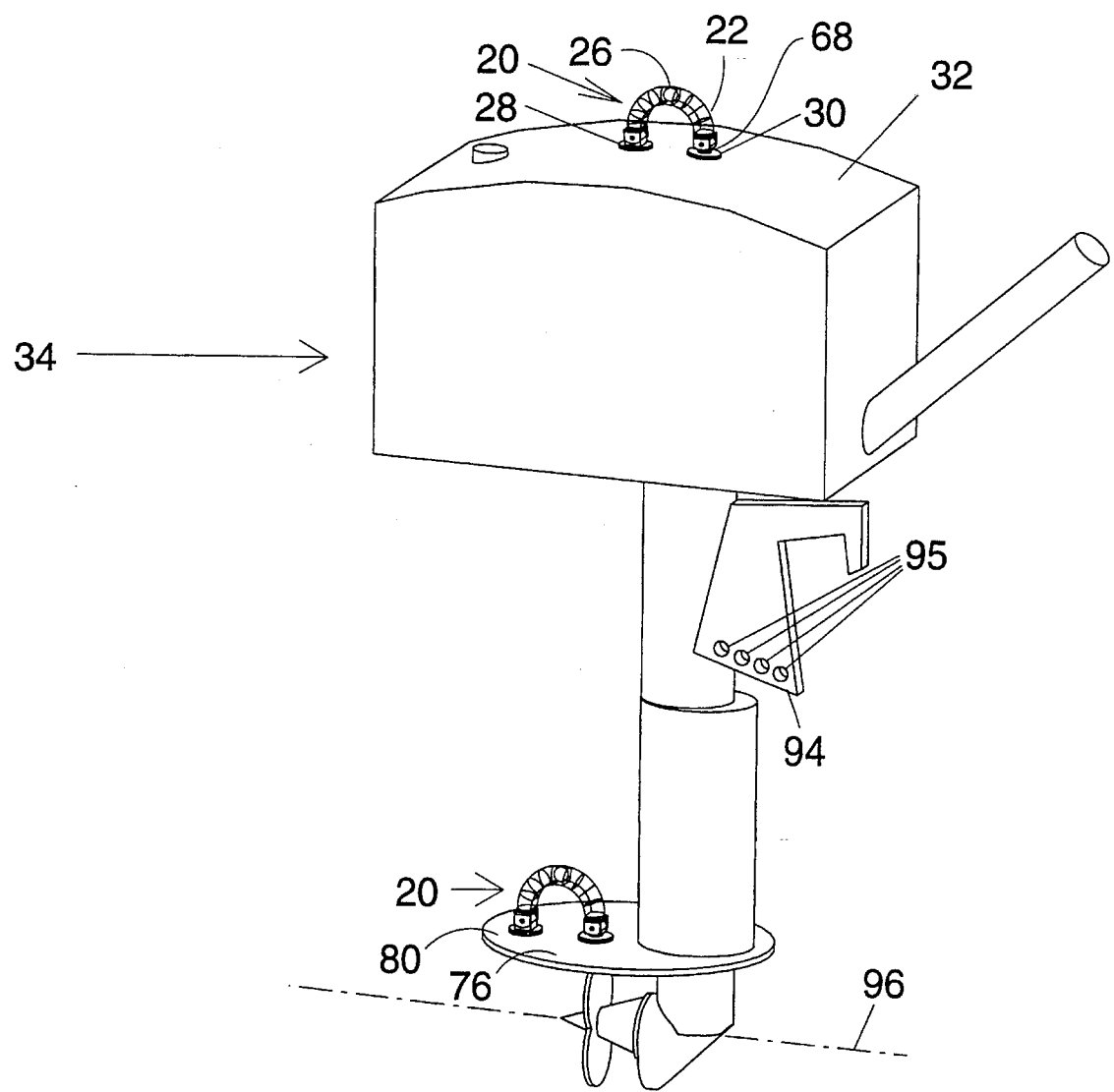
FIG. 2 shows a diagrammatic perspective view of the preferred embodiment mounted on an outboard boat motor not having a hydrofoil stabilizer.

As shown in FIG. 2, on boat motors 34 without a hydrofoil stabilizer attached to the anti-cavitation plate 76, the trim position indicator 20 can be initially placed directly on the upper surface 80 of the anti-cavitation plate 76 in an orientation parallel to the axis 96 of the propeller shaft. Then the boat motor is tilted until the spherical float 26 is centered between the two central indicator markings 46, 46. Then the trim position indicator 20 is placed in the center of the cover or shroud of the boat motor in an orientation which is parallel to the axis 96 of the propeller shaft, and the height adjustment of the trim position indicator is adjusted until the spherical float 26 is again centered between the two central indicator markings 46, 46. At this point, the position of the trim position indicator 20 on the motor cover is noted, and the backing paper is peeled off the adhesive material 38 on the lower surfaces 40 of the sticky mounting bases 28, 30. Then the trim position indicator 20 is pressed down onto the motor cover at the previously noted position.

Figure 3:
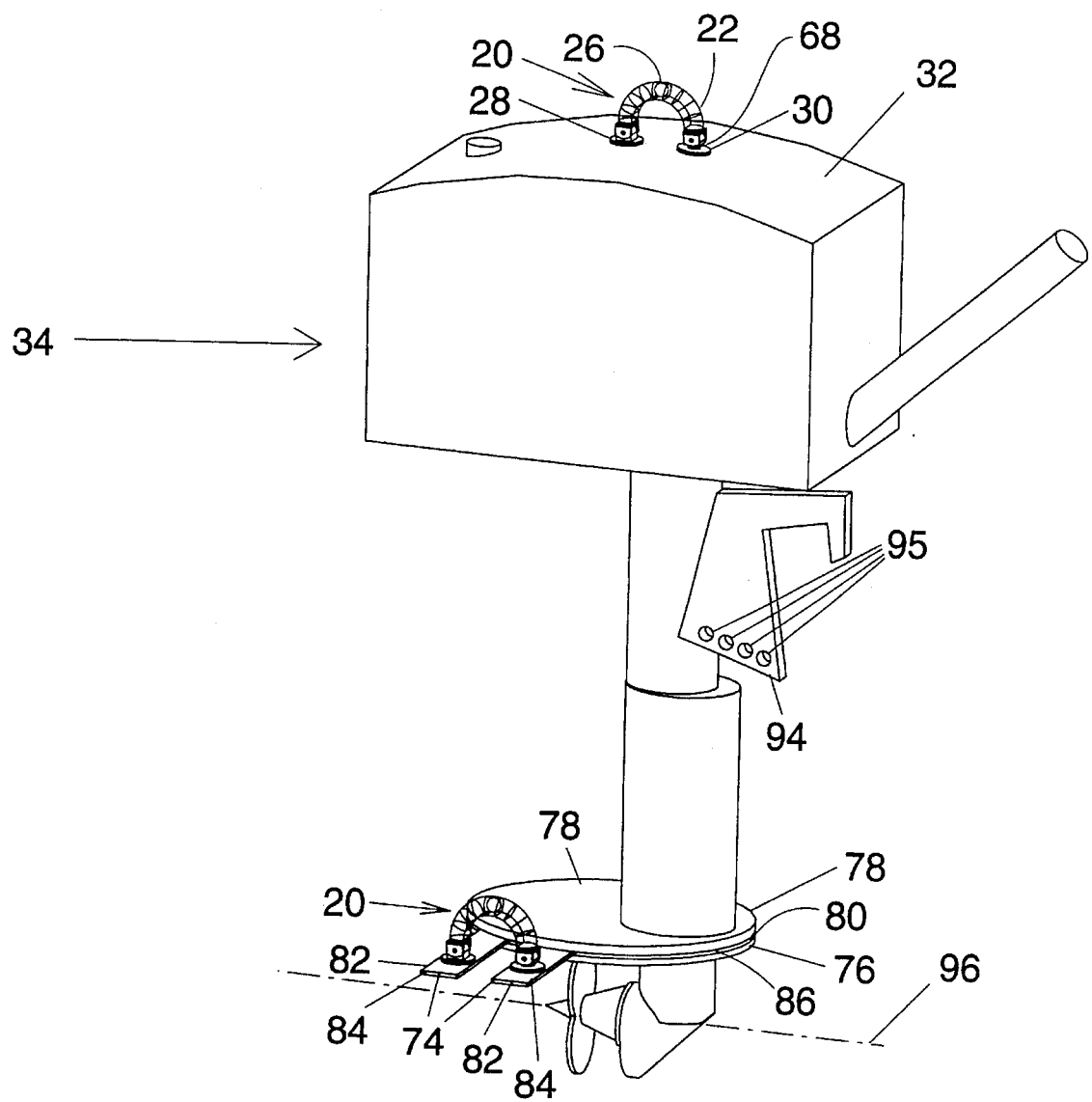
FIG. 3 shows a diagrammatic perspective view of the preferred embodiment mounted on an outboard boat motor having a hydrofoil stabilizer attached to the anti-cavitation plate.

As shown in FIG. 3, the most preferred embodiment of the trim position indicator 20 further consists of means 74 for extending the anti-cavitation plate 76 so that the trim position indicator 20 may be used with boat motors which have a hydrofoil stabilizer (symbolically shown as 78) attached to the upper surface 80 of its anti-cavitation plate 76.

As shown in FIG. 3, on boat motors where there is sufficient clearance between the anti-cavitation plate 76 and the hydrofoil stabilizer 78, the preferred means for extending the anti-cavitation plate 76 is one or two thin rectangular plates 82 of a sturdy material such as metal or plastic such as extension tabs 84. The extension tabs 84 are inserted in the small clearance 86 between the anti-cavitation plate 76 and the hydrofoil stabilizer 78. Thus, a support surface is provided for the trim position indicator 20 to be placed thereon.

Figure 4:
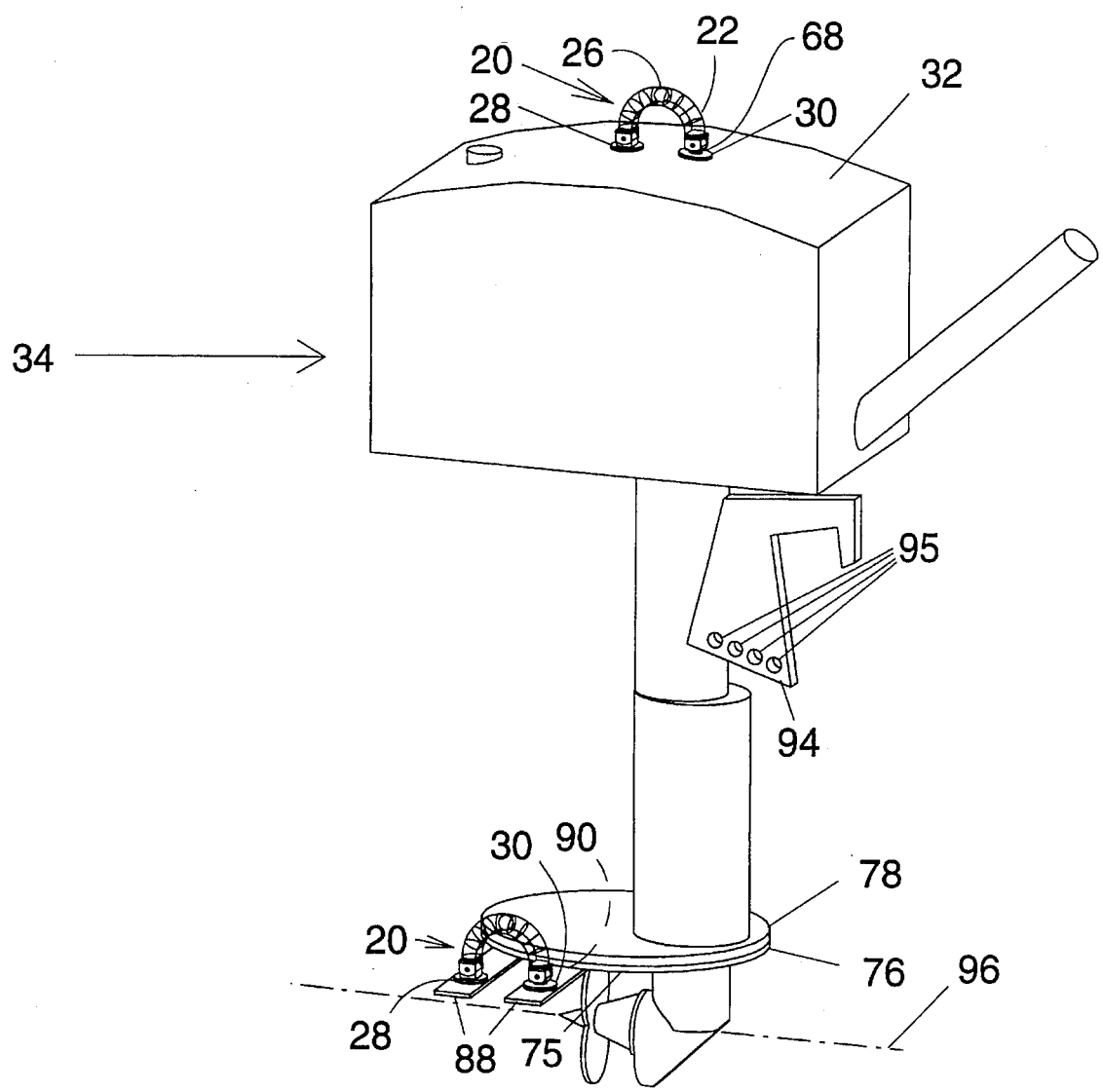
FIG. 4 shows another diagrammatic perspective view of the preferred embodiment mounted on an outboard boat motor having a hydrofoil stabilizer attached to the anti-cavitation plate.
Figure 6:
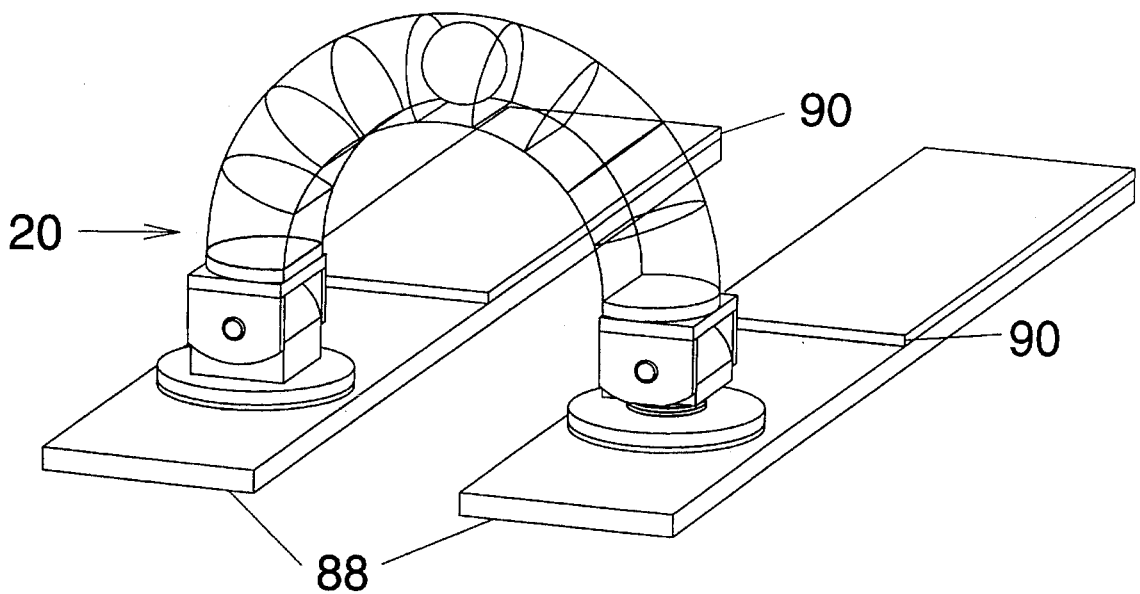
FIG. 6 shows a diagrammatic perspective view of the preferred embodiment sitting on extension tabs to which are attached pieces of sticky tape.

As shown in FIG. 4, in those cases where there is insufficient clearance between the anti-cavitation plate 76 and the hydrofoil stabilizer 78 for thin plates to be inserted, the preferred means for extending the anti-cavitation plate 76 is one or two thin plates 88 each having a piece of sticky tape 90 (better seen in FIG. 6) attached to a portion thereof. When the sticky tape portions of the thin plates 88 are pressed against the under surface 75 of the anti-cavitation plate 76, a support surface is provided for the trim position indicator 20.

Figure 5:
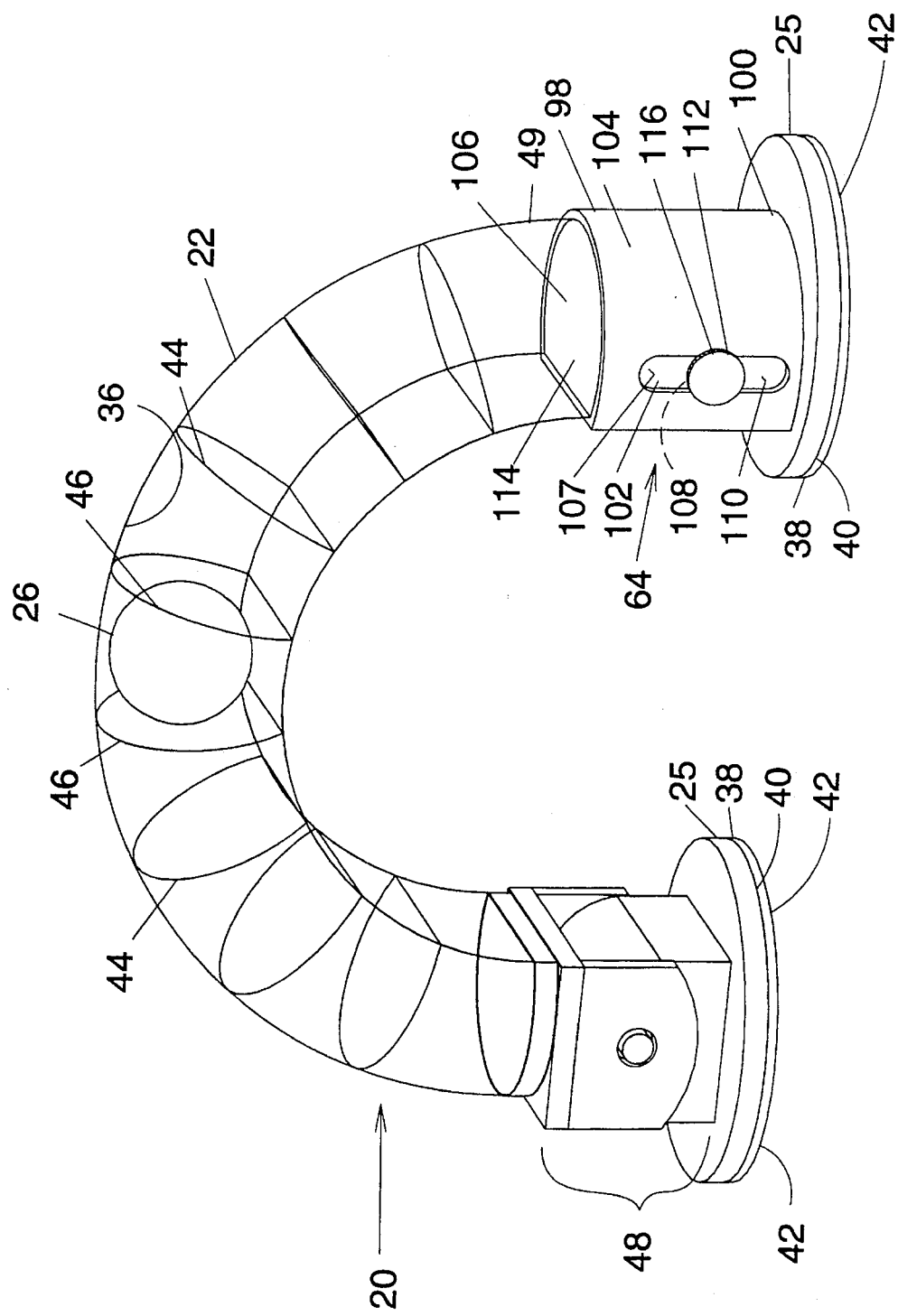
FIG. 5 shows a side perspective view of a lesser preferred embodiment.
Figure 9:
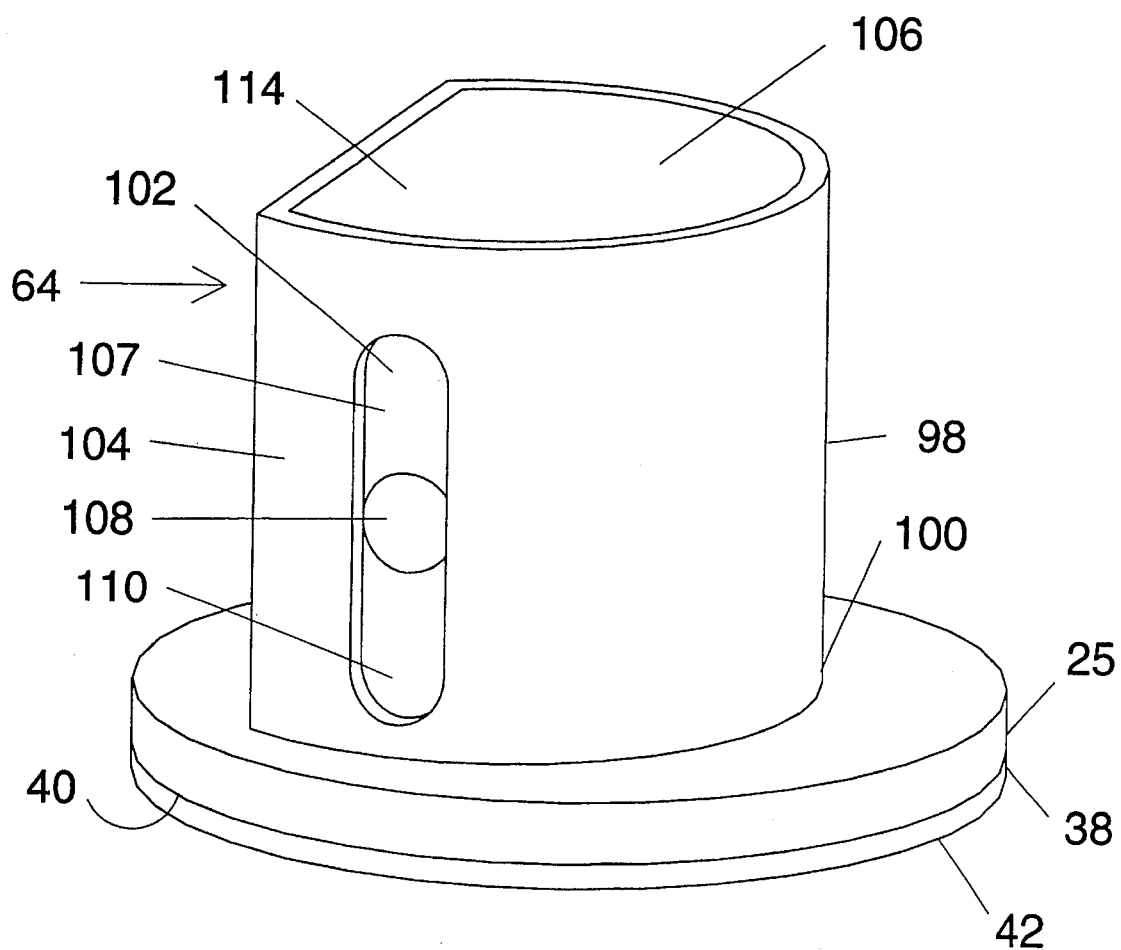
FIG. 9 is an enlarged perspective view of a portion of just the means for adjusting height of FIG. 5 and shows the adjusting screw removed from the adjusting screw platform to reveal the threaded aperture.

Shown in FIG. 5 is a lesser preferred embodiment of the trim position indicator. In this embodiment, there are means for adjusting height 64 at one or both ends of the transparent tube 22. In this embodiment, the means for adjusting height 64 is positioned between and connects an end 49 of the transparent tube 22 with the sticky mounting base 25 at that end 49 of the transparent tube 22. The means for adjusting height 64 consists of a slotted adjustment base 98 which is connected at its lower end 100 to the sticky mounting base 25. The slotted adjustment base 98 has an elongated vertical slot 102 extending through a side 104 of the slotted adjustment base 98. The slotted adjustment base 98 interfaces with an adjusting screw platform 107 (of which 106 shows the upper surface thereof and 110 shows a portion of the side thereof) which has a threaded aperture 108 on its side 110 (hidden behind the head 116 of adjusting screw 112) and an adjusting screw 112 partially threaded into the aperture 108. The threaded aperture 108 is best shown in FIG. 9 which is an enlarged view of just the means for adjusting height 64. FIG. 9 shows the adjusting screw 112 removed from the adjusting screw platform 107 to reveal the threaded aperture 108. The adjusting screw platform 107 is fixedly connected at its upper end 114 to the end 49 of the transparent tube 22 and is so positioned with respect to the slotted adjustment base 98 that the adjusting screw 112 protrudes through the slot 102 in the side 104 of the slotted adjustment base 98. Thus the adjusting screw platform 107 (and the end of the tube 49 to which the adjusting screw platform 107 is fixedly attached) is vertically slidably movable with respect to the slotted adjustment base 98 for the purpose of varying the height of the end 49 of the transparent tube 22 to which the means for adjusting height 64 is connected. When the end of the transparent tube 49 has been sufficiently raised to center the float 26 between the two central indicator markings 46, 46, the adjusting screw 112 is tightened until its head 116 presses against the side 104 of the slotted adjustment base 98 thus "freezing" the end 49 of the tube 22 of the trim position indicator 20 at that height.

Figure 7:
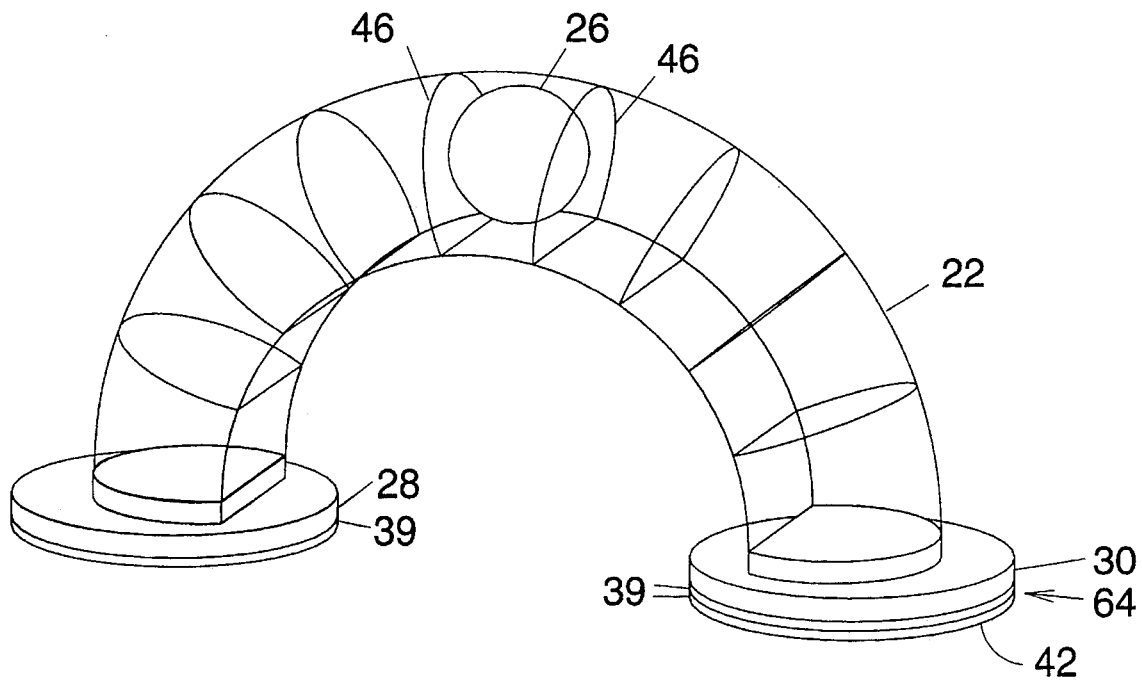
FIG. 7 shows a side perspective view of another lesser preferred embodiment with an additional mounting pad attached to the lower surface of the second mounting base.

Shown in FIG. 7 is another lesser preferred embodiment of the trim position indicator. This embodiment consists of an upwardly arched arcuate transparent tube 22 with a spherical float 26 therein and mounting bases 28, 30 at either end of the tube 22. In this embodiment, the means for adjusting height 64 is very thin mounting pads 39 covered with adhesive on both the upper and lower surfaces. The adhesive on each surface is covered with backing paper 42 to keep the adhesive from drying out or becoming contaminated. These mounting pads 39 are stacked one on top of the other and placed under the mounting base of the end of the tube 22 which it is desired to raise until the spherical float 26 therein is centered between the two central indicator markings 46, 46. FIG. 7 shows one mounting pad 39 attached to the left mounting base 28 and two mounting pads 39, 39 attached to the right mounting base 30 under the right end of the tube 22 in order to raise the right end of the tube slightly with respect to the left end of the tube.

5.4 Method of Using the Trim Position Indicator

5.4.1 Method of Mounting a Liquid Filled Level on the Cover of an Outboard Motor to Provide an Indication of Tilt Angle So That the Tilt Angle Can Be Adjusted for Optimal Performance The following methods are applicable when using either my trim position indicator or any upwardly arching liquid filled level having the following characteristics:

(a) means 64 are provided for varying the height of at least one end of the level;

(b) there is at least one indicator marking 46 on the level indicating the center of the level;

(c) the level has floatings, in it a substantially spherical float 26 with a lower specific gravity than the specific gravity of the liquid in the level; and (d) means are provided for attaching the ends of level to the cover of the boat motor (such as adhesive material at each end of the level).

The following means will avail for varying the height of at least one end of the level:

(a) Very thin mounting pads 39 covered with adhesive on both the upper and lower surfaces. The adhesive on each surface is covered with backing paper 42 to keep the adhesive from drying out or becoming contaminated. These mounting pads 39 are placed under the end of the level which it is desired to raise. One of my lesser preferred embodiments (FIG. 7) uses this means to vary the height of one end of his trim position indicator.

(b) Means for adjusting height at one or both ends of the level. My trim position indicator uses various means for adjusting height 64 in its various embodiments:

A threaded adjustment rod or screw 68 which can be turned by turning the sticky mounting base 30 to which it is fixedly attached in order to raise or lower the end of the trim position indicator 20;

A slotted adjustment base 98 with a tightening adjusting screw 112 for tightening the base 98 against the adjusting screw platform 107 when the proper height of the end 49 of the tube 22 is achieved.

Mounting pads stacked under one or both ends of the trim position indicator to vary the height thereof.

5.4.1.1 Case 1: When the Motor is not Attached to a Boat (a) Use the mounting clamps of the motor to attach the motor to a fixed mounting platform such as an outboard motor mounting stand, a workbench, a saw horse, or the like.

(b) For motors 34 not having a hydrofoil stabilizer: Place the trim position indicator 20 or liquid filled level on the upper surface 80 of the anti-cavitation plate 76 at an orientation parallel to the axis 96 of the propeller shaft. (By placing the trim position indicator 20 or liquid filled level on the anti cavitation plate as close as possible to the side of the lower motor leg, one can usually be assured that the trim position indicator or level is aligned with the axis 96 of the propeller shaft inasmuch as the wall of the lower motor leg is usually in line with the axis 96 of the propeller shaft.)

For motors having a hydrofoil stabilizer 78 attached to the anti-cavitation plate 76: Attach means for extending the anti-cavitation plate 74, to the anti-cavitation plate 76 so as to provide a support surface for the level.

On boat motors where there is sufficient clearance between the anti-cavitation plate 76 and the hydrofoil stabilizer 78 (FIG. 3), the preferred means for extending the anti-cavitation plate 74 is one or two thin rectangular plates 82 of a sturdy material such as metal or plastic. Insert these thin plates 82 in the small clearance 86 between the anti-cavitation plate 76 and the hydrofoil stabilizer 78. Thus, a support surface is provided for the liquid filled level to be placed thereon prior to performing the next step (step (c) below).

In those cases where there is insufficient clearance between the anti-cavitation plate 76 and the hydrofoil stabilizer 78 for thin plates to be inserted (FIG. 4), the preferred means for extending the anti-cavitation plate 76 is one or two thin rectangular plates 88 each having a piece of sticky tape 90 (best shown in FIG. 6) attached to a portion thereof. Then the sticky tape portion 90 of the thin plate 88 is pressed against the under surface 75 of the anti-cavitation plate 76, thus providing a support surface for the liquid filled level. Now place the liquid filled level on the support surface(s) 88 at an orientation parallel to the axis 96 of the propeller shaft.

(c) Tilt the boat motor 34 until the spherical float 26 is centered between the two central indicator markings 46, 46. This is done by first performing a coarse tilt angle adjustment and then a fine tilt angle adjustment. Perform the coarse tilt angle adjustment as follows: Release the motor's tilt angle adjustment lock, and move the motor's tilt pin adjustment 95 positive or negative (up or down) (thus varying the tilt of the boat motor) until the level's spherical float 26 is as close to being centered as possible between the two central indicator markings 46, 46. The fine tilt angle adjustment can be performed by placing a sufficient number of thin shims under one side or the other of the outboard motor mounting stand or workbench being used to support the motor in order to cause the float 26 to exactly center between the two central indicator markings 46, 46.

(d) Secure the motor so that the angle does not change while performing the following steps.

(e) Remove all dirt, wax, and grease from the portion of the motor cover 32 where the liquid level is to be placed. It is recommended that the liquid level be placed on top of the motor where it can be easily viewed. Now place the liquid filled level on the cover 32 of the tilted motor in an orientation parallel to the axis 96 of the propeller shaft. (Although it is not necessary that the level be placed exactly parallel with the axis of the propeller shaft, this could be very nearly done by drawing a longitudinal line down the center of the motor cover, and placing the level so that this longitudinal line bisects the mounting bases of the level.)

(f) Adjust the height of at least one end of the level (by adding mounting pads 39 under that end of the level, raising or lowering the end of the tube 49 in the slotted adjustment base 98, or turning the sticky mounting base 30 attached to the threaded adjustment rod or screw 68, depending upon the means for adjusting height 64 of the level) until the spherical float 26 is centered between the two central indicator markings 46, 46. When using my preferred embodiment of the trim position indicator 20 (FIG. 1), turn the second sticky mounting base 30 which is attached to the threaded adjusting rod or screw 68 to raise or lower the second end 66 of the transparent tube 22 so as to center the spherical float 26 between the two middle indicator markings 46, 46.

(g) Note the location of the liquid filled level on the motor cover. Affix the adjusted level of step (f) to the cover 32 of the motor at the just noted location in an orientation parallel to the axis 96 of the propeller shaft. When using my preferred embodiment (FIG. 1) of the trim position indicator 20, this can be done by peeling off the backing paper 42 covering the sticky adhesive portion 38 of each of the sticky mounting bases 28, 30 and pressing the sticky adhesive portions 38 of the mounting bases 28, 30 of the trim position indicator 20 against the motor cover 32 at the noted location in an orientation parallel to the axis 96 of the propeller shaft.

5.4.1.2 Case 2: When the Motor is Attached to a Boat (a) With the boat on its trailer, lower the swivel jack, or place the front of the trailer on a jack stand or block of wood.

(b) For motors 34 not having a hydrofoil stabilizer: Place the trim position indicator 20 or liquid filled level on the upper surface 80 of the anti-cavitation plate 76 at an orientation parallel to the axis 96 of the propeller shaft. (By placing the trim position indicator 20 or liquid filled level on the anti-cavitation plate as close as possible to the side of the lower motor leg, one can usually be assured that the trim position indicator or level is aligned with the axis 96 of the propeller shaft inasmuch as the wall of the lower motor leg is usually in line with the axis 96 of the propeller shaft.)

For motors having a hydrofoil stabilizer 78 attached to the anti-cavitation plate 76. Attach means for extending the anti-cavitation plate 74, to the anti-cavitation plate 76 so as to provide a support surface for the level.

On boat motors where there is sufficient clearance between the anti-cavitation plate 76 and the hydrofoil stabilizer 78 (FIG. 3), the preferred means for extending the anti-cavitation plate 74 is one or two thin rectangular plates 82 of a sturdy material such as metal or plastic. Insert these thin plates 82 in the small clearance 86 between the anti-cavitation plate 76 and the hydrofoil stabilizer 78. Thus, a support surface is provided for the liquid filled level to be placed thereon prior to performing the next step (step (c) below).

In those cases where there is insufficient clearance between the anti-cavitation plate 76 and the hydrofoil stabilizer 78 for thin plates to be inserted (FIG. 4), the preferred means for extending the anti-cavitation plate 76 is one or two thin rectangular plates 88 each having a piece of sticky tape 90 (best shown in FIG. 6) attached to a portion thereof. Then the sticky tape portion 90 of the thin plate 88 is pressed against the under surface 75 of the anti-cavitation plate 76, thus providing a support surface for the liquid filled level. Now place the liquid filled level on the support surface(s) 88 at an orientation parallel to the axis 96 of the propeller shaft.

(c) Tilt the boat motor until the spherical float 26 is centered between the two central indicator markings 46, 46. This is done by first performing a coarse tilt angle adjustment and then a fine tilt angle adjustment. Perform the coarse tilt angle adjustment as follows: Release the motor's trim angle adjustment lock, and move the motor's trim angle adjustor 95 positive or negative (up or down) (thus varying the tilt of the boat motor) until the level's float 26 is as close to being centered as possible between the two central indicator markings 46, 46. The fine tilt angle adjustment is performed by raising or lowering the trailer's swivel jack until the float 26 in the level is exactly centered.

(d) Secure the motor so that the angle does not change while performing the following steps.

(e) Remove all dirt, wax, and grease from the portion of the motor cover 32 where the liquid level is to be placed. It is recommended that the liquid level be placed on top of the motor where it can be easily viewed. Now place the liquid filled level on the cover 32 of the tilted motor in an orientation parallel to the axis 96 of the propeller shaft.

(f) Adjust the height of at least one end of the level (by adding mounting pads 39 under that end of the level, raising or lowering the end of the tube 49 in the slotted adjustment base 98, or turning the sticky mounting base 30 attached to the threaded adjustment rod or screw 68, depending upon the means for adjusting height 64 of the level) until the spherical float 26 is centered between the two central indicator markings 46, 46. When using my preferred embodiment of the trim position indicator 20 (FIG. 1), turn the second sticky mounting base 30 which is attached to the threaded adjusting rod or screw 68 to raise or lower the second end 66 of the transparent tube 22 so as to center the spherical float 26 between the two middle indicator markings 46, 46.

(g) Note the location of the liquid filled level on the motor cover. Affix the adjusted level of step (f) to the cover 32 of the motor at the just noted location in an orientation parallel to the axis 96 of the propeller shaft. When using my preferred embodiment (FIG. 1) of the trim position indicator 20, this can be done by peeling off the backing paper 42 covering the sticky adhesive portion 38 of each of the sticky mounting bases 28, 30 and pressing the sticky adhesive portions 38 of the mounting bases 28, 30 of the trim position indicator 20 against the motor cover 32 at the noted location in an orientation parallel to the axis 96 of the propeller shaft.

5.4.2 Method of Using the Trim Position Indicator in the Trimming of a Boat 5.4.2.1 Low Speed Operation Adjust the tilt angle of the motor so that the Trim Position Indicator shows a level reading. While underway and only if conditions permit viewing the trim position indicator, observe the trim position indicator. The trim position indicator's float should be within the two most central indicator markings; if not, adjust the motor's tilt angle until a level reading is obtained.

5.4.2.2 High Speed Operation

When adjusting for high speed operation, the best performance is attained by tilting the motor so that the anti-cavitation plate is parallel to and even with the lower planing surface of the boat's hull. The lower planing surface of the hull should be nearly parallel with the surface of the water. It is best to start out with the trim position indicator showing a level reading at high speed. Then try setting the tilt angle on the motor one position down. This will cause the float in the trim position indicator to move towards the front of the boat. If no improvement is noticed, return to the first level operating setting.

The addition of a hydrofoil stabilizer on the motor, or the use of trim tabs on the boat will help to keep the bow of the boat down. One may also solve the problem of a poorly trimmed boat by distributing the weight more evenly about the boat.

One can now mark the trim positions for high and low speed operation. However, if the boat is loaded differently the next time out, or the number of passengers is increased or decreased, the settings will change. This is not a real problem since one can now tell by a glance at the trim position indicator if the tilt angle requires readjustment in order to restore peak performance.

5.5 Advantages of the Invention

The previously described versions of the present invention have many advantages, including:

Due to increased performance, there is a large fuel saving. When the propeller is properly trimmed, it is operating at peak efficiency.

Due to the ability to establish the proper boat trim, propeller slippage can be virtually eliminated. An untrimmed propeller has a compressed and turbulent path in the water. Its inefficient motion results in a high degree of slippage. A motor equipped with a 12 inch pitch propeller should propel the boat forward 12 inches with each revolution of the propeller. Under the conditions of poor trim, if the boat is propelled only 9 inches with each revolution of the propeller, this is a slippage of 25 percent.

Rooster tail and bow hop are virtually eliminated, thus giving the boat passengers a more pleasurable enjoyable ride.

Since the trim position indicator does not require a source of electric power to operate, smaller boats without electric power can now be properly trimmed with tremendous fuel saving, and a much more pleasurable, smoother ride.

5.6 LIST OF REFERENCE NUMBERS

- 20 trim position indicator
- 22 upwardly arched arcuate transparent tube
- 24 liquid
- 25 a sticky mounting base (FIG. 5)
- 26 spherical float
- 28 first sticky mounting base
- 30 second sticky mounting base
- 32 upper portion or surface of the cover of boat motor
- 34 boat motor
- 36 upper inner surface of transparent tube
- 38 adhesive material
- 39 thin mounting pad
- 40 lower surface of sticky mounting base
- 42 piece of backing paper
- 44 indicator marking
- 46 two central indicator markings
- 48 means for pivoting
- 49 an end of the closed transparent tube
- 50 first end of closed transparent tube
- 52 first pivot platform
- 54 side surface of a pivot platform
- 56 pivot peg
- 58 first support platform
- 60 flexible ear
- 62 hole in flexible ear
- 64 means for adjusting height
- 66 second end of closed transparent tube
- 68 threaded rod or screw
- 70 second pivot platform
- 71 lower surface of second pivot platform
- 72 second support platform
- 73 threaded aperture
- 74 means for extending the anti-cavitation plate
- 75 under surface of the anti-cavitation plate
- 76 anti-cavitation plate
- 78 hydrofoil stabilizer
- 80 upper surface of anti-cavitation plate
- 82 thin rectangular plate
- 84 extension tab
- 86 small clearance between anti-cavitation plate and hydrofoil stabilizer
- 88 thin rectangular plates with sticky tape attached to a portion of it
- 90 sticky tape
- 92 motor having a hydrofoil stabilizer
- 94 motor's stern bracket
- 95 motor's tilt pin adjustment
- 96 axis of the propeller shaft
- 98 slotted adjustment base
- 100 lower end of slotted adjustment base
- 102 elongated vertical slot
- 104 side of the adjustment base
- 106 upper surface of adjusting screw platform
- 107 adjusting screw platform
- 108 threaded aperture on side of adjusting screw platform
- 110 side of adjusting screw platform
- 112 adjusting screw
- 114 upper end of adjusting screw platform
- 116 head of adjusting screw It will be understood that each of the elements described above, or two or more together may also find a useful application in other types of devices and methods differing from those types described above.

5.7 Alternatives and the Closing

Thus the reader will see that my trim position indicator supplies a long felt need for a simple, economical, easy to use device which can indicate the relative position of the motor's anti-cavitation plate with respect to the water surface, thus indicating when the trim of the boat requires adjustment for maximum performance. If one should aver that my trim position indicator and the methods of installing and using it are obvious, then one is hard put to explain why all the small boat owners have decided not to install such a device on their boat motors, and have decided to continue to endure such phenomena as porpoising, bow hop, and cavitation with resulting fuel wastage, poor boat handling, and poor performance. As it is, the small boat owner has no means whatsoever of indicating that his boat is properly trimmed, and the market place currently has nothing to offer.

Although the present invention has been described in considerable detail with reference to certain preferred versions thereof, other versions are possible which will be apparent to those who are skilled in the art. For example, the means for pivoting could consist of a socket having a concave opening fixedly attached to the first sticky mounting base, and a ball support platform fixedly connected to the first end of the tube. The ball support platform would then have downwardly extending sides and a ball fixedly attached to its end. The ball would be of sufficient diameter to snap into the socket when it is depressed into the socket. Thus the ball of the ball support platform could be either snapably inserted into to or withdrawn from the socket. Thus, while certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Therefore, the spirit and scope of the appended claims should not be limited to the description of the preferred versions contained herein, but by the appended claims and their legal equivalents.

I claim:

1. A trim position indicator for mounting on the cover of a boat motor having a propeller with a propeller shaft, for use in water having a surface, said trim position indicator being characterized by its indicating the relative angle between the propeller shaft and the surface of the water, said trim position indicator comprising:

a) a closed transparent tube having a first end having a first sticky mounting base, and a second end having a second sticky mounting base, said sticky mounting bases being for mounting said transparent tube on said cover, said transparent tube having a given shape and at least one wall having an inner surface and an outer surface, said inner surface of said wall having an upper portion and a lower portion, said inner surface defining a space within said tube;

b) a substantially spherical float having a predetermined specific gravity disposed within said transparent tube; and c) a liquid filling the space in the tube around said spherical float, said liquid having a specific gravity greater than the specific gravity of said float.

2. A trim position indicator as recited in claim 1, wherein said tube has a plurality of indicator markings thereon, two of said indicator markings being separated from one another by a distance substantially equal to the diameter of said float and being positioned on the tube so as to indicate that the trim position indicator is levelled when the float is centered between said two of said indicator markings.

3. A trim position as recited in claim 2, wherein said float and said indicator markings are luminescent, whereby said float and said indicator markings may be easily viewed in poorly lit surroundings.

4. A trim position indicator as recited in claim 3, wherein said float is hollow and filled with air or a light gas, whereby said float shall trend to rise toward the upper portion of the inner wall of the closed transparent tube.

5. A trim position indicator as recited in claim 2, further comprising a means for adjusting height, said means for adjusting height connecting and end of said transparent tube with the stickly mounting base at said end of the transparent tube, whereby adjustment may be made so as to center said float within said indicator markings.

6. A trim position indicator as recited in claim 5, wherein said means for adjusting height is connected to said second end of said transparent tube, said trim position indicator further comprising a means for pivoting at said first end of said closed transparent tube, said means for pivoting connecting said first end of said tuber with the sticky mounted base at said first end of the transparent tube.

7. A trim position indicator as recited in claim 6, wherein said means for pivoting comprises:

(a) a first pivot platform fixedly attached to said first sticky mounting base, said first pivot platform having two side surfaces, each of said side surfaces having pivot pegs extending outwardly therefrom; and (b) a first support platform fixedly connected to said first end of said tube, said first support platform having two flexible ears projecting downwardly therefrom, said flexible ears having holes extending therethrough, said holes being sufficiently sized for the reception of said pivot pegs, said flexible ears of said first support platform being removably fitted over said pivot pegs of said first pivot platform so that said pivot pegs protrude through said holes in said flexible ears whereby said first pivot platform is rotatable with respect to said first support platform.

8. A trim position indicator as recited in claim 7, wherein said first and second sticky mounting bases comprise double sided mounting pads with adhesive means on each side thereof.

9. A trim position indicator as recited in claim 6, wherein said means for adjusting height comprises:

(a) a threaded rod or screw fixedly attached to said second sticky mounting base;

(b) a second pivot platform having an upper surface, a lower surface, and two side surfaces, said lower surface having a threaded aperture therein adapted to receive said threaded rod or screw, and each of said side surfaces having pivot pegs extending outwardly therefrom; and (c) a second support platform fixedly connected to said second end of said tube, said second support platform having two flexible ears projecting downwardly therefrom, said flexible ears having holes extending therethrough, said holes being sufficiently sized for the reception of said pivot pegs, said flexible ears of said second support platform being removably fitted over said pivot pegs of said second pivot platform so that said pivot pegs protrude through said holes in said flexible ears whereby said second pivot platform is rotatable with respect to said second support platform, whereby said flexible ears of said support platforms may be either snapably attached to or detached from said pivot platforms.

10. A trim position indicator as recited in claim 5, wherein said means for adjusting height comprises:

(a) a slotted adjustment base having two side surfaces, each of said side surfaces having an elongated vertical slot extending therethrough, said slotted adjustment base being connected to said sticky mounting base; and (b) an adjusting screw platform having a threaded aperture and an adjusting screw partially threaded into said aperture, said adjusting screw platform being so positioned with respect to said slotted adjustment base that said adjusting screw protrudes through said slot in said adjustment base, said adjusting screw platform being fixedly connected to said end of said transparent tube; whereby said adjusting screw platform is vertically movable with respect to said slotted adjustment base for varying the height of the end of the transparent tube to which the means for adjusting height is connected.

11. A trim position indicator as recited in claim 1, wherein said float is hollow and filled with air or a light gas, whereby said float shall tend to rise toward the upper portion of the inner wall of the closed transparent tube.

12. A trim position indicator as recited in claim 1, wherein said closed transparent tube has an upper wall and a lower wall, said upper wall being convex in shape, said walls defining a space within said tube.

13. A trim position indicator as recited in claim 1, wherein said liquid is a low-freezing-point liquid.

14. The trim position indicator of claim 1 for use on a boat motor having an anti-cavitation plate having a hydrofoil stabilizer attached thereto, said trim position indicator further comprising means for extending the anti-cavitation Plate.

15. The trim position indicator of claim 14, wherein the means for extending the anti-cavitation plate comprises a thin plate of suitable dimensions for wedging between the anti-cavitation plate and the hydrofoil stabilizer so as to provide a platform for the trim position indicator.

16. The trim position indicator of claim 14, wherein the means for extending the anti-cavitation plate comprises a thin plate with a piece of sticky tape attached to a portion thereof so that the thin plate may be attached via its piece of sticky tape to the lower surface of the anti-cavitation plate in such a way that the thin plate will extend outwardly from the motor and provide a platform for the trim position indicator.

17. A method of mounting a liquid filled level on the cover of an outboard motor in order to provide an indication of tilt angle so that the tilt angle can be adjusted for optimal performance, said level having (a) at least one end of adjustable height;

(b) at least one indicator marking indicating the center thereof; and (c) a substantially spherical float floating therein;

said outboard motor having an anti-cavitation plate having an upper surface and a lower surface, said method comprising the steps of:

(a) placing said liquid filled level on the upper surface of said anti-cavitation plate;

(b) tilting the motor until said spherical float in the liquid filled level is centered within the level;

(c) placing said liquid filled level on the cover of said tilted motor;

(d) adjusting the height of at least one end of said level until said spherical float is centered within the level; and (e) affixing the height adjusted level of step (d) to said cover of said motor.

18. A method of mounting a liquid filled level on the cover of an outboard motor in order to provide an indication of tilt angle so that the tilt angle can be adjusted for optimal performance, said level having (a) at least one end of adjustable height;

(b) at least one indicator marking indicating the center of the liquid filled level; and (c) a substantially spherical float floating therein, said outboard motor having an anti-cavitation plate having an upper surface and a lower surface, and a hydrofoil stabilizer attached to the upper surface of the anti-cavitation plate, said method comprising the steps of:

(a) attaching means for extending the anti-cavitation plate, to said anti-cavitation plate so as to provide a support surface for said level;

(b) placing said liquid filled level on said support surface;

(c) tilting the motor until said spherical float is centered within the level;

(d) placing said liquid filled level on the cover of said tilted motor;

(e) adjusting the height of at least one end of said level until said spherical float is centered within the level; and (f) affixing the height adjusted level of step (e) to said cover of said motor.

19. The method of claim 18 wherein said means for extending the anti-cavitation plate is a thin plate for insertion between the anti-cavitation plate and the hydrofoil stabilizer, whereby a surface is provided for said liquid filled level to be placed thereon.

20. The method of claim 18 wherein said means for extending the anti-cavitation plate is a thin plate having a piece of sticky tape attached to a portion thereof so that the thin plate may be attached to the lower surface of the anti-cavitation plate, whereby a projection of said plate provides a surface for said liquid filled level to be placed thereon.

* * * * *

UNITED STATES PATENT AND TRADEMARK OFFICE
CERTIFICATE OF CORRECTION

PATENT NO. : 5,584,731
DATED : December 17, 1996
INVENTOR(S) : Thomas A. Dombrowski It is certified that error appears in the above-indentified patent and that said Letters Patent is hereby corrected as shown below:

Col. 2, on line 15, replace "to,the" with --to the--.

Col. 11, on line 15, replace "has floatings, in it" with --has floating in it--.

Col. 11, on lines 53-54, replace:
"level on the anti
cavitation plate as close as possible to the side of the" with --level on the anti-cavitation plate as close as possible to the side of the--.

Col. 13, on line 19, replace "plate 76." with --plate 76:--.

Col. 17, in Claim 5, line 3, replace "connecting and end" with --connecting an end--.

Col. 17, in Claim 6, line 6, replace "tuber" with --tube--.

UNITED STATES PATENT AND TRADEMARK OFFICE
CERTIFICATE OF CORRECTION

PATENT NO. : 5,584,731
DATED : December 17, 1996
INVENTOR(S) : Thomas A. Dombrowski It is certified that error appears in the above-indentified patent and that said Letters Patent is hereby corrected as shown below:

Col. 18, in Claim 14, line 5, replace "Plate" with --plate--.

Signed and Sealed this

Tenth Day of June, 1997

*Attest:*

BRUCE LEHMAN

*Attesting Officer*      *Commissioner of Patents and Trademarks*